Patented Apr. 22, 1930

1,755,544

UNITED STATES PATENT OFFICE

EDUARD JALOWETZ, OF VIENNA, AUSTRIA

PROCESS OF IMPROVING BREWING WATERS

No Drawing. Application filed August 18, 1926, Serial No. 130,101, and in Austria November 20, 1925.

My invention relates to a new process of improving brewing-waters. The influence of the mineral matters of the brewing-waters on the quality of the beer is well known. Especially it has been proved, that the carbonates of lime and magnesia have a very unfavorable effect on the taste and the colour of the beer. Efforts have therefore been made to improve the brewing-waters by removing the carbonates in different ways. Good results have been obtained in some cases, but more often no satisfaction was obtained especially, when the water contained larger quantities of carbonate of magnesia.

In some cases the addition of gypsum had a good influence on the brewing-water. A number of English brewing-chemsists found a very favorable effect of gypsum on the colour and the breaking of the wort as well as on the taste and on the keeping qualities of the beer, due to an improved action of the diastasic and peptic enzymes on the starch and on the albuminoid matters of the malt-wort.

Professor Windisch studied the effects of gypsum, but could not confirm the good results obtained from the English brewers. He found in some cases that more albuminoid matters were dissolved, than it was desirable, but that a larger quantity of the same were removed again during the boiling of the wort and on pasteurizing the beer. He reported however, that on adding gypsum in quantities up to 50 grammes to 100 litres mashing-water beers of a fuller and milder taste could be obtained; he found also a favorable influence on the colour.

On the whole the results of the addition of gypsum after the rule of the thumb were very doubtful and therefore it has been given up practically entirely.

Lately the effect of gypsum on the brewing-process has been studied again and it was found, that waters containing gypsum and carbonates of lime and magnesia influence the malt-mash in such a way, that the secondary phosphates of potash are converted into primary phosphates; at the same time unsoluble phosphates of lime are formed. Through this process an increase of acidity is effected having a favorable influence on the colour and brightness of the beer. To ensure these effects some brewers were induced to add larger quantities of gypsum, up to 80 grammes to the hectolitre, with the result, that considerable quantities of soluble salts, for instance sulphate of potash and a surplus of gypsum got into the beer, causing a disagreeable taste.

Now a large number of experiments have been carried out, showing the fact, that all favorable effects of gypsum can be obtained, excluding all undesirable reactions of a surplus addition, if the addition of gypsum is regulated in such a way, that the quantity of sulphate of lime is in exact stoichiometric proportion to the quantity of carbonate of lime and magnesia. Through the equilbrium between sulphates and carbonates the undesirable alkaline effect of the latter on the nitrogenous matters of the malt is stopped and the acid reaction of the wort increased, as can be easily shown by the decreasing pH figure. In this way every surplus of gypsum is prevented and the beer obtained from water prepared in this way has a greenish-yellow, not a reddish colour and a very mild taste, without an unpleasant aftertaste. If the quantities of carbonates of lime and magnesia are too high, than it is advisable to remove these carbonates totally or partially as far as necessary, for instance, by means of limewater or by some other means and to add a quantity of gypsum equivalent to the carbonates remaining in the water.

If the water already contains considerable amounts of gypsum besides carbonates, the amount of gypsum must be taken into account and only such a guantity of gypsum must be added so as to get the stiochiometric proportion between sulphates and carbonates of lime and magnesia.

It will be in some cases unnecessary to add gypsum at all, if sufficient quantity is already in the water, but to remove such an amount of carbonates as to get the stoichiometric proportion between these and the sulphates of lime, or even to add some bicarbonate of lime so as to get the right proportion between sulphates and carbonates,

*Example 1.*—To 100 litres of water of a total-hardness of 8.6° and of a carbonate-hardness of 6.7°, 16.3 grammes of sulphate of lime are added and dissolved.

*Example 2.*—A water of 19.6° total-hardness and of 15.4° carbonate-hardness is treated with lime-water and the carbonate-hardness reduced to 6.2°. To 100 litres of this water are then added 15.4 grammes sulphate of lime.

*Example 3.*—To 100 litres of water of a carbonate-hardness of 10.95° and a sulphate-hardness of 8.1°, either 6.9 grammes sulphate of lime or 2.83 oxide of lime are added. The water treated in one of these ways contains the sulphates of lime and magnesia and the carbonates of these salts in exactly stoichiometrical proportions.

What I claim is:

1. A process of improving brewing-waters by adding gypsum in such quantity that a stoichiometrical proportion is obtained between sulphates and carbonates of lime and magnesia.

2. A process of improving brewing-waters by adding sulphate of lime in a quantity equivalent to the carbonates of lime and magnesia contained in the water.

3. A process of improving brewing-waters by adding gypsum in a quantity equivalent to the carbonates of lime and magnesia contained in the water.

4. A process of improving brewing-waters by adding gypsum to the water, from which the carbonates of lime and magnesia have been previously partially removed, in a quantity equivalent to the remaining carbonates of lime and magnesia.

5. A process of improving brewing-waters by regulating the stoichiometrical proportions between sulphates and carbonates of lime and magnesia contained in the water, taking in consideration the amount of sulphate of lime already present in the water by adding either the necessary quantity of sulphate of lime, or removing the necessary quantities of carbonates of lime and magnesia in a suitable way, so the water contains the equivalent quantities of sulphates of lime and magnesia and of the carbonates of lime and magnesia.

6. A process of improving brewing-waters by adding sulphate of lime in a quantity equivalent to the carbonates of lime and magnesia contained in the water and by regulating into stoichiometrical proportions the sulphates and carbonates of lime and magnesia contained in the water, taking in consideration the amount of sulphate of lime already present in the water.

7. A process of improving brewing-waters by adding sulphate of lime and adjusting the sulphates into stoichiometrical proportions with the carbonates of lime and magnesia contained in the water, taking in consideration the amount of sulphate of lime already present in the water.

8. A process of improving brewing-waters containing carbonates of lime and magnesia in greater than stoichiometrical quantities of sulphate of lime by removing the necessary quantities of carbonates of lime and magnesia in a suitable way so that the water contains the equivalent quantities of sulphates of lime and magnesia and of carbonates of lime and magnesia.

9. A process of improving brewing-waters containing carbonates of lime and magnesia in greater than stoichiometrical quantities of sulphate of lime by removing the necessary quantities of carbonates of lime and magnesia by adding the required amount of oxyde of lime so that the water contains the equivalent quantities of sulphates of lime and magnesia and of the carbonates of lime and magnesia.

In testimony whereof I affix my signature.

EDUARD JALOWETZ.